United States Patent [19]

Miles et al.

[11] 4,427,573
[45] Jan. 24, 1984

[54] POLYMERIZATION CATALYST, PROCESS FOR PREPARING, AND USE FOR ETHYLENE POLYMERIZATION

[75] Inventors: David L. Miles, Neshanic; Frederick J. Karol; George L. Goeke, both of Belle Mead, Burkhard E. Wagner, Highland Park, all of N.J.

[73] Assignee: Union Carbide Corporation, Danbury, Conn.

[21] Appl. No.: 302,846

[22] Filed: Sep. 16, 1981

[51] Int. Cl.$^3$ ............................................. C08F 4/64
[52] U.S. Cl. ..................... 502/111; 526/125; 502/105; 502/126; 502/127
[58] Field of Search ....................................... 252/429 B

[56] References Cited

U.S. PATENT DOCUMENTS

| | | | |
|---|---|---|---|
| 3,412,174 | 11/1968 | Kroll | 252/429 B X |
| 3,943,067 | 3/1976 | Chan et al. | 252/430 |
| 4,293,673 | 10/1981 | Hamer et al. | 252/429 B X |
| 4,302,565 | 11/1981 | Goeke et al. | 252/429 B X |
| 4,302,566 | 11/1981 | Karol et al. | 526/348 X |
| 4,349,648 | 9/1982 | Jorgenson et al. | 252/429 B X |
| 4,354,009 | 10/1982 | Goeke et al. | 252/429 B X |

*Primary Examiner*—Patrick Garvin
*Attorney, Agent, or Firm*—John S. Piscitello

[57] ABSTRACT

Catalyst compositions suitable for producing ethylene polymers in a low pressure gas phase process are produced by forming a partially activated precursor composition from a magnesium compound, titanium compound, inert carrier material and an organoaluminum activator compound in an electron donor solvent.

10 Claims, 1 Drawing Figure

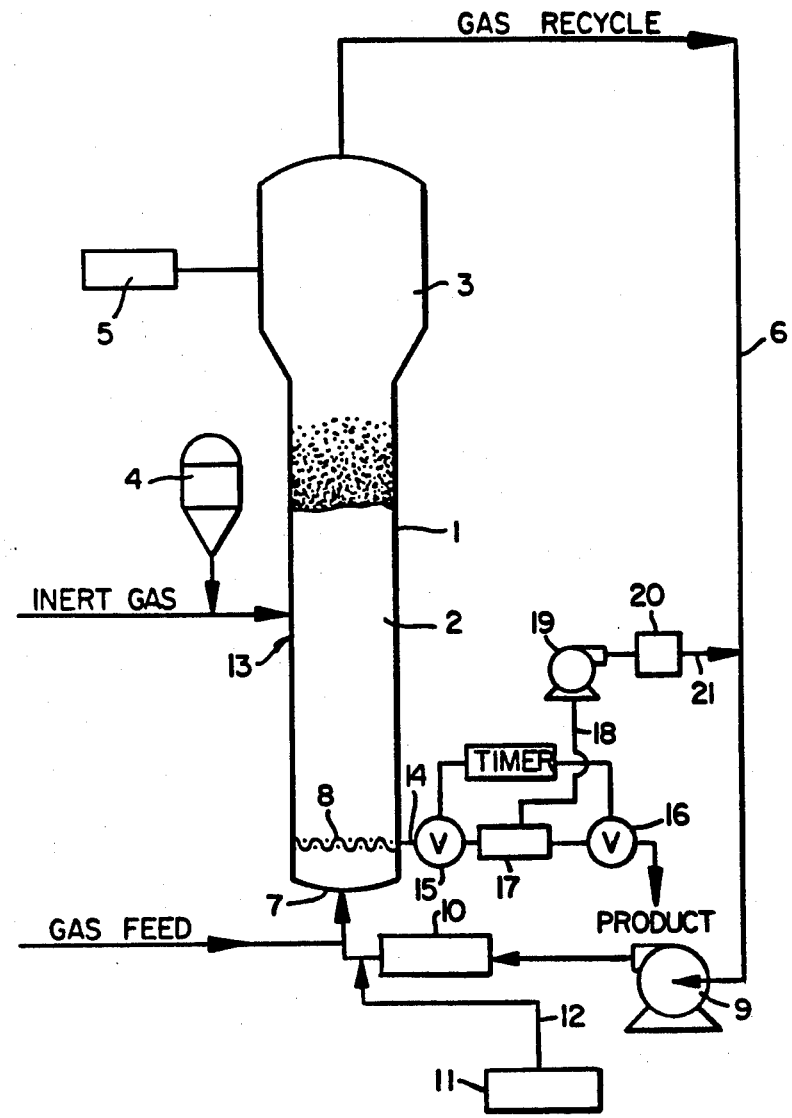

POLYMERIZATION CATALYST, PROCESS FOR PREPARING, AND USE FOR ETHYLENE POLYMERIZATION

BACKGROUND OF THE INVENTION

1. Field of the Invention

The invention relates to an improved process for the preparation of high activity magnesium and titanium containing complex catalysts for the polymerization of ethylene in a gas phase process to produce polymers having a density of $\geq 0.91$ to $\leq 0.97$; a melt flow ratio of $\geq 22$ to $\leq 32$; and a bulk density of 14 to 32 lbs/ft$^3$.

2. Description of the Prior Art

To be commercially useful in a gas phase process, such as the fluid bed process of U.S. Pat. Nos. 3,709,853; 4,003,712 and 4,011,382, Canadian Pat. No. 991,798 and Belgium Pat. No. 839,380, the catalyst employed must be a high activity catalyst, that is, it must have a level of productivity of $\geq 50,000$, and preferably of $\geq 100,000$ pounds of polymer per pound of primary metal in the catalyst. This is so because such gas phase processes usually do not employ any catalyst residue removing procedures. Thus, the catalyst residue in the polymer must be so small that it can be left in the polymer without causing any undue problems in the hands of the resin fabricator and/or ultimate consumer. Where a high activity catalyst is successfully used in such fluid bed processes, the transition metal content of the resin is of the order of $\leq 20$ parts per million (ppm) at a productivity level of $\geq 50,000$. Low catalyst residue contents are also important where the catalyst is made with chlorine containing materials such as the titanium, magnesium and/or aluminum chlorides used in some so-called Ziegler or Ziegler-Natta catalysts. High residual chlorine values in a molding resin will cause pitting and corrosion on the metal surfaces of the molding devices. Molding grade resins having Cl residues of the order of $\geq 200$ ppm are not commercially useful.

U.S. Pat. Nos. 3,922,322 and 4,035,560 disclose the use of several Ti and Mg containing catalysts for the manufacture of granular ethylene polymers in a gas phase fluid bed process under a pressure of <1000 psi. The use of these catalysts in these processes, however, has significant disadvantages. The catalysts of U.S. Pat. No. 3,922,322 provide polymers having a very high catalyst residue content, i.e., about 100 ppm of Ti and greater than about 300 ppm Cl, according to the working example of this patent. Further, as disclosed in the working example of U.S. Pat. No. 3,922,322, the catalyst is used in the form of a prepolymer, and very high volumes of the catalyst composition must be fed to the reactor relative to the volume of polymer made in the reactor. The preparation and use of this catalyst thus requires the use of relatively large sized equipment for the manufacture, storage and transporting of the catalyst.

The catalysts of U.S. Pat. No. 4,035,560 also provides polymers having high catalyst residues, and the catalyst compositions are apparently pyrophoric because of the types and amounts of reducing agents employed in such catalysts.

U.S. patent application Ser. No. 892,325, filed Mar. 31, 1978, now abandoned and refiled as Ser. No. 014,414 on Feb. 27, 1979, in the names of F. J. Karol et al., and entitled "Preparation of Ethylene Copolymers in Fluid Bed Reactor", now U.S. Pat. No. 4,302,566, discloses that ethylene copolymers, having a density of 0.91 to 0.96, a melt flow ratio of $\geq 22$ to $\leq 32$ and a relatively low residual catalyst content can be produced in granular form, at relatively high productivities, if the monomer(s) are polymerized in a gas phase process with a specific high activity Mg-Ti containing complex catalyst which is blended with an inert carrier material. The granular polymers thus produced have excellent physical properties which allow them to be used in a broad range of molding applications.

U.S. patent application Ser. No. 892,037 filed on Mar. 31, 1978, now abandoned and refiled as Ser. No. 014,412 on Feb. 27, 1979, and refiled again as Ser. No. 249,447 on Mar. 31, 1981, in the names of B. E. Wagner et al. and entitled "Polymerization Catalyst, Process for Preparing, And Use For Ethylene Homopolymerization", now U.S. Pat. No. 4,395,359, discloses that ethylene homopolymers having a density range of 0.958 to 0.972 and a melt flow ratio of $\geq 22$ to $\leq 32$ and which have a relatively low residual catalyst residue can be produced at relatively high productivities for commercial purposes by a low pressure gas phase process if the ethylene is homopolymerized in the presence of a high activity magnesium-titanium complex catalyst blended with an inert carrier material.

U.S. patent application Ser. No. 892,322 filed on Mar. 31, 1978, now abandoned and refiled as Ser. No. 012,720 on Feb. 16, 1979, in the names of G. L. Goeke et al. and entitled "Impregnated Polymerization Catalyst, Process For Preparing, and Use For Ethylene Copolymerization", now U.S. Pat. No. 4,302,565, discloses that ethylene copolymers having a density of about 0.91 to 0.94 and a melt flow ratio of $\geq 22$ to $\leq 32$ and which have a relatively high bulk density and which provide films of good clarity can be produced at relatively high productivities for commercial purposes by a gas phase process if the ethylene is copolymerized with one or more C$_3$ to C$_8$ alpha olefins in the presence of a high activity magnesium-titanium complex catalyst prepared under specific activation conditions with an organoaluminum compound and impregnated in a porous inert carrier material.

However, the preparation of the impregnated catalyst precursor as taught in U.S. Pat. No. 4,302,565, can be difficult to control and the carrier material used for the impregnation can be of variable composition. If considerable care is not taken, variable catalyst performance can occur. Since polymer morphology appears to be dependent on the morphology of the carrier used for the catalyst, total flexibility and control of polymer particle characteristics is, at times, not possible.

U.S. patent application Ser. No. 974,013 filed on Dec. 28, 1978 now abandoned and refiled as Ser. No. 095,010 on Nov. 28, 1979, in the names of A. D. Hamer et al. and entitled "Spheroidal Polymerization Catalyst, Process for Preparing, and Use for Ethylene Polymerization," now U.S. Pat. No. 4,293,673 discloses that ethylene polymers having a wide density range of about $\geq 0.91$ to $\leq 0.97$, a bulk density of about 18 to 32 lbs/ft$^3$, a melt flow ratio of $\geq 22$ to $\leq 32$, and which are of controlled particle shape and size, and which have a relatively low residual titanium content can be produced at relatively high productivities for commercial purposes by a gas phase process if the ethylene is homopolymerized, or copolymerized with one or more C$_3$ to C$_8$ alpha olefins, in the presence of a high activity magnesium-titanium complex catalyst prepared by spray drying a magnesium-titanium containing precursor composition from a slurry or solution in an electron donor solvent and subsequently activating such spray dried precursor composition under specific activation conditions with an organoaluminum compound.

The catalyst preparation disclosure in U.S. Pat. No. 4,302,565 teaches that first a catalyst precursor composition is prepared from a titanium compound, a magnesium compound and an electron donor solvent; a carrier material previously treated with an organoaluminum compound is then impregnated with a THF solution of the precursor composition; and finally the supported precursor composition is treated with an activator compound in one or more steps.

In more detail, U.S. Pat. No. 4,302,565 teaches that preferably the precursor composition is formed by dissolving the titanium compound and the magnesium compound in the electron donor solvent at a temperature of about 20° C. up to the boiling point of the electron donor solvent. The titanium compound can be added to the electron donor solvent before or after the addition of the magnesium compound, or concurrent therewith. The dissolution of the titanium compound and the magnesium compound can be facilitated by stirring, and in some instances by refluxing these two compounds in the electron donor solvent. After the titanium compound and the magnesium compound are dissolved, the precursor composition may be isolated in some manner such as crystallization or by precipitation with a $C_5$ to $C_8$ aliphatic or aromatic hydrocarbon such as hexane, isopentane or benzene and subsequently dried.

The dried precursor composition is in the form of fine, free flowing particles having an average particle size of about 10 to 100 microns and a bulk density of about 18 to 33 pounds per cubic foot.

The precursor composition is then impregnated, in a weight ratio of about 0.033 to 1, and preferably about 0.1 to 0.33, parts of the precursor composition into one part by weight of the carrier material.

The impregnation of the support with the precursor composition may be accomplished by dissolving the precursor composition in the electron donor solvent, and by then admixing the support with the dissolved precursor composition so as to allow the precursor composition to impregnate the support. The solvent is then removed by drying at temperatures of ≦70° C.

The support is preferably impregnated with the precursor composition by adding the support to a solution of the chemical raw materials used to form the precursor composition in the electron donor solvent, without isolating the precursor composition from such solution. The excess electron donor solvent is then removed by drying, or decanting and drying, at temperatures of ≦70° C.

In order to prepare a useful catalyst, the supported precursor composition must be treated with sufficient activator compound to transform the Ti atoms in the precursor composition to an active state. However, it is necessary to conduct the activation in such a way that, at least the final activation stage is conducted in the absence of solvent so as to avoid the need for drying the fully active catalyst to remove solvent therefrom. Two procedures have been developed to accomplish this result.

In one procedure, the precursor composition is completely activated, outside the reactor, in the absence of solvent, by dry blending the impregnated precursor composition with the activator compound. In this dry blending procedure the activator compound is used while impregnated in a carrier material. In this procedure the fully activated precursor composition is prepared without having to heat the composition above 50° C. prior to feeding it to the polymerization reactor.

In the second, and preferred of such prior art catalyst activation precedures, the precursor composition is partially activated outside the polymerization reactor with enough activator compound so as to provide a partially activated precursor composition which has an activator compound/Ti molar ratio of about <0 to >10:1 and preferably of about 4 to 8:1. This partial activation reaction is preferably carried out in a hydrocarbon solvent slurry followed by drying of the resulting mixture, to remove the solvent, at temperatures between 20° to 80° C. and preferably of 50° to 70° C. The resulting product is a free-flowing, solid particulate material which can be readily fed to the polymerization reactor. The partially activated and impregnated precursor composition is fed to the polymerization reactor where the activation is completed with additional activator compound which can be the same or a different compound.

The above-described catalyst preparation of U.S. Pat. No. 4,302,565 requires a minimum of two drying stages: (1) excess electron donor solvent removal from the impregnated composition; and (2) hydrocarbon solvent removal from the partially activated precursor composition.

The above-described preferred catalyst preparation of U.S. Pat. No. 4,302,565 requires a minimum of at least three drying stages: (1) hydrocarbon solvent removal from the treated carrier; (2) excess electron donor solvent removal from the impregnated precursor composition; and (3) hydrocarbon solvent removal from the partially activated impregnated precursor composition. It may be desirable to isolate the precursor composition, in which case an additional drying step is required to remove excess electron donor solvent. The number of drying steps is a critical limitation to the commercial attractiveness of these catalyst compositions.

Drying at each stage in the catalyst preparation plays an important role in determining the final catalyst properties since the drying conditions determine the final electron donor and activator content. Furthermore, as a result of the porosity of the inert carrier material utilized in the preferred embodiments of U.S. Pat. No. 4,302,565, as well as other considerations, the drying times of some of the stages in commercial catalyst preparation processes have exceeded 15 hours. Even with extensive expenditures for drying enhancement, such as imposing vacuums, the drying stages follow the time constraints imposed by the classical behavior of the drying of porous solid slurries. The drying rate typically falls into two regions: constant rate region and falling rate region. In the constant rate region, the solid surface is saturated with evaporating liquid and the rate of drying is controlled by the rate of heat transfer to the evaporating surface. Since the rate of mass transfer balances the rate of heat transfer, the temperature of the saturated surface remains constant. When the surface concentration falls below the saturation point, the drying rate starts to fall and the drying rate is dictated by the ability of the liquid to diffuse to the surface. This is the falling rate region and the solid surface temperature in this period starts to increase because of the diffusion limitation. Movement within the solid results from a concentration gradient which is dependent upon the characteristics of the solid. Of course, the solid temperature asymptotically reaches the vessel wall temperature as the liquid concentration approaches zero.

Removal of excess electron donor solvent from the precursor composition is especially critical. Excess electron donor solvent is essential in order to completely dissolve the magnesium and titanium compounds. However, the patent literature teaches that excess electron donor solvent should be removed prior to activation of a catalyst precursor. For example, U.S. Pat. No. 4,120,883 to H. Sakurai et al. discloses that whenever organomagnesium complexes are employed as catalysts, ethers should not be employed as solvents for the synthesis and, if used, should be removed prior to activation.

Furthermore, in the prior art it was recognized that electron donor solvents such as tetrahydrofuran and activator compounds such as the aluminum alkyls react to form 1:1 adducts (R. N. Haszeldine et al., Polymer, 14,215 (1973)). Since formation of these adducts might destroy the beneficial effects of the activator compound, U.S. Pat. Nos. 4,302,565, 4,302,566 and 4,395,359 specifically described the need to minimize the electron donor content of the precursor composition and to partially activate the precursor in a hydrocarbon diluent in order to avoid the presence of excess electron donor solvent.

SUMMARY OF THE INVENTION

It has now been unexpectedly discovered that magnesium and titanium containing complex catalysts, useful in the polymerization of ethylene in a gas phase process to produce polymers having a density of $\geq 0.91$ to $\leq 0.97$; a melt flow ratio of $\geq 22$ to $\leq 32$; and a bulk density of 14 to 32 lbs/ft$^3$, can be prepared by partial activation with an organoaluminum compound in the presence of an electron donor solvent.

An object of the present invention is to provide a method for preparing, using only one drying step, a partially activated magnesium-titanium complex precursor useful in the gas phase polymerization of ethylene.

A further object of the present invention is to provide an activated magnesium-titanium complex catalyst with high productivity useful in the gas phase polymerization of ethylene.

BRIEF DESCRIPTION OF THE DRAWINGS

The drawing shows a gas phase fluid bed reactor system in which the catalyst system of the present invention may be employed.

DESCRIPTION OF THE PREFERRED EMBODIMENT

It has now been found that ethylene polymers having a wide range of densities; relatively high bulk densities; and desirable particle configurations can be prepared at high productivities in a low pressure gas phase fluid bed reaction process if the monomer charge is polymerized under a specific set of operating conditions, as detailed below, and in the presence of a specific catalyst which is impregnated in an inert porous carrier material and has been partially activated in an electron donor solvent.

THE ETHYLENE POLYMERS

The ethylene polymers have a melt flow ratio of $\geq 22$ to $\leq 32$, and preferably of $\geq 25$ to $\leq 30$. The melt flow ratio value is another means of indicating the molecular weight distribution of a polymer. The melt flow ratio (MFR) range of $\geq 22$ to $\leq 32$ thus corresponds to a Mw/Mn value range of about 2.7 to 4.1 and the MFR range of $\geq 25$ to $\leq 30$ corresponds to a Mw/Mn range of about 2.8 to 3.6.

The homopolymers have a density of about $\geq 0.958$ to $\leq 0.972$. The copolymers have a density of about $\geq 0.91$ to $\leq 0.96$. The density of the copolymer, at a given melt index level for the copolymer, is primarily regulated by the amount of the $C_3$ to $C_8$ comonomer which is copolymerized with the ethylene. In the absence of the comonomer, the ethylene would homopolymerize with the catalyst of the present invention to provide homopolymers having a density of about $\geq 0.958$. Thus, the addition of progressively larger amounts of the comonomers to the copolymers results in a progressive lowering of the density of the copolymer. The amount of each of the various $C_3$ to $C_8$ comonomers needed to achieve the same result will vary from comonomer to comonomer, under the same reaction conditions.

Thus, to achieve the same results, in the copolymers, in terms of a given density, at a given melt index level, larger molar amounts of the different comonomers would be needed in the order of $C_3 > C_4 > C_5 > C_6 > C_7 > C_8$.

The melt index of a copolymer is a reflection of its molecular weight. Polymers having a relatively high molecular weight, have a relatively low melt index. Ultra-high molecular weight ethylene polymers have a high load (HLMI) melt index of about 0.0 and very high molecular weight ethylene polymers have a high load melt index (HLMI) of about 0.0 to about 1.0. Such high molecular weight polymers are difficult, if not impossible, to mold in conventional injection molding equipment. The polymers made in the process of the present invention, on the other hand, can be readily molded, in such equipment. They have a standard or normal load melt index of $\geq 0.0$ to about 100, and preferably of about 0.5 to 80, and a high load melt index (HLMI) of about 11 to about 2000. The melt index of the polymers which are made in the process of the present invention is a function of a combination of the polymerization temperature of the reaction, the density of the copolymer and the hydrogen/monomer ratio in the reaction system. Thus, the melt index is raised by increasing the polymerization temperature and/or by decreasing the density of the polymer and/or by increasing the hydrogen/monomer ratio. In addition to hydrogen, other chain transfer agents such as dialkyl zinc compounds may also be used to further increase the melt index of the copolymers.

The copolymers which may be prepared in the process of the present invention are copolymers of a major mol percent ($\geq 90\%$) ethylene, and a minor mol percent ($\leq 10\%$) of one or more $C_3$ to $C_8$ alpha olefins. The $C_3$ to $C_8$ alpha olefins should not contain any branching on any carbon atom which is closer than the fourth carbon atom. The preferred $C_3$ to $C_8$ alpha olefins are propylene, butene-1, pentene-1, hexene-1, 4-methylpentene-1 and octene-1.

The ethylene polymers of the present invention have an unsaturated group content of $\leq 1$, and usually $\geq 0.1$ to $\leq 0.3$, C=C/1000 carbon atoms, and an n-hexane extractables content of less than about 3, and preferably less than about 2 weight percent.

The ethylene polymers of the present invention have a residual catalyst content, in terms of parts per million of titanium metal, of the order of $\leq 20$ parts per million, (ppm) at a productivity level of $\geq 50,000$, and of the order of $\leq 10$ parts per million at a productivity level of $\geq 100,000$, and of the order of $\leq 5$ parts per million at a productivity level of $\geq 200,000$ pounds of polymer per pound of primary metal in the catalyst.

The ethylene polymers of the present invention have a bulk density of about 14 to 32 lbs/ft.³. Particles of the ethylene polymers are spheroidal and have an average particle size of the order of about 0.010 to 0.12 inches, and preferably of about 0.010 to 0.06 inches, in diameter.

The homopolymers produced herein are usual for a variety of molded articles.

The copolymers of the present invention are useful for making film as well as molding applications.

HIGH ACTIVITY CATALYST

The compounds used to form the high activity catalyst used in the present invention comprise at least one titanium compound, at least one magnesium compound, at least one electron donor solvent, and at least one activator compound, as defined below.

The titanium compound has the structure $$Ti(OR)_a X_b$$

wherein

R is a $C_1$ to $C_{14}$ aliphatic or aromatic hydrocarbon radical, or $COR^I$ where $R^I$ is a $C_1$ to $C_{14}$ aliphatic or aromatic hydrocarbon radical, X is Cl, Br, I or mixtures thereof, a is 0 to 4 inclusive, b is 0 to 4 inclusive, and $a+b=3$ or 4.

The titanium compounds can be used individually or in combinations thereof, and would include $TiCl_3$, $TiCl_4$, $Ti(OCH_3)Cl_3$, $Ti(OC_6H_5)Cl_3$, $Ti(OCOCH_3)Cl_3$ and $Ti(OCOC_6H_5)Cl_3$.

The magnesium compound has the structure:

$$R_n^{II} MgX_2^{I-n}$$

wherein $X^I$ is Cl, Br, I or mixtures thereof and n is equal to 0, 1 or 2. When n is 1 or 2, an additional halogen source is used, such as $ZnCl_2$ or $Et_aAlCl_b$ where $a+b=3$ and $b>0$, e.g., ethylaluminum dichloride and $R^{II}$ is selected from the group consisting of $R^{III}$, $OR^{III}$ and $OCOR^{III}$ where $R^{III}$ is the same or different $C_1$ to $C_{14}$ aliphatic or aromatic hydrocarbon radical. The halogen source need only be a compound which upon reaction with a magnesium source tends to form appropriate amounts of the magnesium halides of the instant invention. In some cases, the optional halogen source can be added to the polymerization reactor in lieu of adding it to the partially activated precursor in the mixing tank. When n is zero (0) the structural formula is $MgX_2^I$.

The magnesium compounds can be used individually or in combination thereof and would include $MgCl_2$, $MgBr_2$, $MgI_2$ and $Mg(OEt)_2$. Anhydrous $MgCl_2$ is the particularly preferred magnesium compound.

About 0.5 to 56, and preferably about 1 to 10, mols of the magnesium compound are used per mol of the titanium compound in preparing the catalysts employed in the present invention.

The titanium and magnesium compounds should be of a physical form and chemical nature such that they will be soluble in the electron donor solvents, as described below.

The electron donor solvents would include such compounds as alkyl esters of aliphatic and aromatic carboxylic acids, aliphatic ethers, and cyclic ethers. Among these electron donor solvents, the preferred ones are alkyl esters of $C_1$ to $C_4$ saturated aliphatic carboxylic acids; $C_2$ to $C_6$, and preferably $C_3$ to $C_4$, aliphatic ethers; and $C_4$ and $C_5$ cyclic ethers; the most preferred of these electron donor solvents would include methyl formate, ethyl acetate, butyl acetate, ethyl ether, propyl ether, tetrahydrofuran, and tetrahydropyran.

The electron donor solvents can be used individually or in combinations thereof. and should be present in an amount at least sufficient to dissolve the titanium and magnesium compounds; preferably greater than 4 mols of electron donor solvent are used per mol of titanium compound.

The carrier materials, i.e., the supports, are solid, particulate materials which are inert to the other components of the catalyst composition, and to the other active components of the reaction system. These carrier materials would include inorganic materials such as oxides of silicon and aluminum and molecular sieves, and organic materials such as olefin polymers such as polyethylene. When the carrier materials are inorganic oxides, they are used in the form of dry powders having an average particle size of about 10 to 250, and preferably of about 50 to 150 microns. These materials are also preferably porous and have a surface area of $\geq 3$, and preferably of $\geq 50$, square meters per gram. The inorganic oxides should be dry, that is, free of absorbed water. Drying of the oxide material is carried out by heating it at a temperature of $>200°$ C.

The activator compound has the structure $$Al(R^{IV})_c X_d^{II} H_e \ PS$$

wherein $X^{II}$ is Cl or $OR^V$;

$R^{IV}$ and $R^V$ are the same or different $C_1$ to $C_{14}$ saturated hydrocarbon radicals, d is 0 to 1.5, e is 1 or 0 and $c+d+e=3$.

Such activator compounds can be used individually or in combinations thereof and would include $Al(C_2H_5)_3$, $Al(C_2H_5)_2Cl$, $Al(i-C_4H_9)_3$, $Al_2(C_2H_5)_3Cl_3$, $Al(i-C_4H_9)_2H$, $Al(C_6H_{13})_3$, $Al(C_2H_5)_2H$ and $Al(C_2H_5)_2(OC_2H_5)$.

Preferably from about 10 to about 400, and more preferably from about 10 to about 200 mols of the activator compound are used per mol of the titanium compound in activating the catalyst employed in the present invention.

CATALYST PREPARATION

The catalyst used in the present invention is prepared by mixing together a magnesium compound, a titanium compound, a support, an electron donor solvent, and a portion of an activator compound. The partially activated precursor composition is isolated from the above mixture, by drying at temperatures below about 70° C. until a free flowing solid is obtained. Several different orders of addition are possible, however, the preferred order of addition is to first add the magnesium compound to a mixture of the electron donor and activator compounds and then to introduce the support and titanium compound.

The partially activated precursor composition should have sufficient activator compound present to provide an activator compound/Ti molar ratio of about $\geq 1$ to $\leq 25:1$, and preferably of about 8 to 15:1 after drying. The activator compound should be present from at least one mol per mol of titanium compound up to a ratio where the excess activator compound causes sticking of the catalyst particles.

In order to render the partially activated precursor composition fully active for ethylene polymerization, activator compound is added to the polymerization reactor to complete, in the reactor, the activation of the precursor composition. The additional activator compound and the partially activated precursor composition are preferably fed to the reactor through separate feed lines. The activator compound may be sprayed into the reactor in the form of a solution thereof in a hydrocarbon solvent such as isopentane, hexane, or mineral oil. This solution usually contains about 2 to 30 weight percent of the activator compound. The activator compound is added to the reactor in such amounts as to provide, in the reactor, with the amounts of activator compound and titanium compound fed with the partially activated precursor composition, a total Al/Ti molar ratio of 10 to 400, and preferably of about 10 to 200. The activator compound added to the reactor, reacts with, and activates or completes the activation of, the titanium compound in the reactor.

In a continuous gas phase process, such as the fluid bed process disclosed below, discrete portions of the partially activated precursor composition are continuously fed to the reactor with discrete portions of activator compound needed to activate or complete the activation of the partially activated precursor composition, during the continuing polymerization process in order to replace active catalyst sites that are expended during the course of the reaction.

THE POLYMERIZATION REACTION

The polymerization reaction is conducted by contacting a stream of the monomer(s), in a gas phase process, such as in the fluid bed process described below, and substantially in the absence of catalyst poisons such as moisture, oxygen, CO, $CO_2$, and acetylene with a catalytically effective amount of the completely activated precursor composition (the catalyst) at a temperature and at a pressure sufficient to initiate the polymerization reaction.

In order to achieve the desired density ranges in the copolymers it is necessary to copolymerize enough of the $\geq C_3$ comonomers with ethylene to achieve a level of $>0$ to 10 mol percent of the $C_3$ to $C_8$ comonomers in the copolymer. The amount of comonomer needed to achieve this result will depend on the particular comonomer(s) employed.

There is provided below a listing of the amounts, in mols, of various comonomers that are copolymerized with ethylene in order to provide polymers having the desired density range at any given melt index. The listing also indicates the relative molar concentration, of such comonomers to ethylene, which are in the recycled gas stream of monomers under reaction equilibrium conditions in the reactor.

| Comonomer | mol % needed in copolymer | Gas Stream Comonomer/Ethylene molar ratio |
| --- | --- | --- |
| propylene | >0 to 10 | >0 to 0.9 |
| butene-1 | >0 to 7.0 | >0 to 0.7 |
| pentene-1 | >0 to 6.0 | >0 to 0.45 |
| hexene-1 | >0 to 5.0 | >0 to 0.4 |
| octene-1 | >0 to 4.5 | >0 to 0.35 |

A fluidized bed reaction system which can be used in the practice of the process of the present invention is illustrated in the drawing. With reference thereto the reactor 1 consists of a reaction zone 2 and a velocity reduction zone 3.

The reaction zone 2 comprises a bed of growing polymer particles, formed polymer particles and a minor amount of catalyst particles fluidized by the continuous flow of polymerizable and modifying gaseous components in the form of make-up feed and recycle gas through the reaction zone. To maintain a viable fluidized bed, the mass gas flow rate through the bed must be above the minimum flow required for fluidization, and preferably from about 1.5 to about 10 times $G_{mf}$ and more preferably from about 3 to about 6 times $G_{mf}$. $G_{mf}$ is used in the accepted form as the abbreviation for the minimum mass gas flow required to achieve fluidization, C. Y. Wen and Y. H. Yu, "Mechanics of Fluidization", Chemical Engineering Progress Symposium Series, Vol. 62, p. 100–111 (1966).

It is essential that the bed always contain particles to prevent the formation of localized "hot spots" and to entrap and distribute the particulate catalyst throughout the reaction zone. On start up, the reactor is usually charged with a base of particulate polymer particles before gas flow is initiated. Such particles may be identical in nature to the polymer to be formed or different therefrom. When different, they are withdrawn with the desired formed polymer particles as the first product. Eventually, a fluidized bed of the desired polymer particles supplants the start-up bed.

The partially activated precursor composition used in the fluidized bed is preferably stored for service in a reservoir 4 under a blanket of a gas which is inert to the stored material, such as nitrogen or argon.

Fluidization is achieved by a high rate of gas recycled to and through the bed, typically in the order of about 50 times the rate of feed of make-up gas. The fluidized bed has the general appearance of a dense mass of viable particles in possible free-vortex flow as created by the percolation of gas through the bed. The pressure drop through the bed is equal to or slightly greater than the mass of the bed divided by the cross-sectional area. It is thus dependent on the geometry of the reactor.

Make-up gas is fed to the bed at a rate equal to the rate at which particulate polymer product is withdrawn. The composition of the make-up gas is determined by a gas analyzer 5 positioned above the bed. The gas analyzer determines the composition of the gas being recycled and the composition of the make-up gas is adjusted accordingly to maintain an essentially steady state gaseous composition within the reaction zone.

To insure complete fluidization, the recycle gas and, where desired, part of the make-up gas are returned over gas recycle line 6 to the reactor at point 7 below the bed. There exists a gas distribution plate 8 above the point of return to aid fluidizing the bed.

The portion of the gas stream which does not react in the bed constitutes the recycle gas which is removed from the polymerization zone, preferably by passing it into a velocity reduction zone 3 above the bed where entrained particles are given an opportunity to drop back into the bed.

The recycle gas is then compressed in a compressor 9 and then passed through a heat exchanger 10 wherein it is stripped of heat of reaction before it is returned to the bed. The temperature of the bed is controlled at an essentially constant temperature under steady state conditions by constantly removing heat of reaction. No noticeable temperature gradient appears to exist within the upper portion of the bed. A temperature gradient will exist in the bottom of the bed in a layer of about 6 to 12 inches, between the temperature of the inlet gas and the temperature of the remainder of the bed. The recycle is then returned to the reactor at its base 7 and to the fluidized bed through distribution plate 8. The compressor 9 can also be placed downstream of the heat exchanger 10.

The distribution plate 8 plays an important role in the operation of the reactor. The fluidized bed contains growing and formed particulate polymer particles as well as catalyst particles. As the polymer particles are hot and possibly active, they must be prevented from settling, for if a quiescent mass is allowed to exist, any active catalyst contained therein may continue to react and cause fusion. Diffusion recycle gas through the bed at a rate sufficient to maintain fluidization throughout the bed is, therefore, important. The distribution plate 8 serves this purpose and may be a screen, slotted plate, perforated plate, a plate of the bubble cap type and the like. The elements of the plate may all be stationary, or the plate may be of the mobile type disclosed in U.S. Pat. No. 3,298,792. Whatever its design, it must diffuse the recycle gas though the particles at the base of the bed to keep the bed in a fluidized condition, and also serve to support a quiescent bed of resin particles when the reactor is not in operation. The mobile elements of the plate may be used to dislodge any polymer particles entrapped in or on the plate.

Hydrogen may be used as a chain transfer agent in the polymerization reaction of the present invention. The ratio of hydrogen/ethylene employed will vary between about 0 to about 2.0 moles of hydrogen per mole of the monomer in the gas stream.

Any gas inert to the catalyst and reactants can also be present in the gas stream. The activator compound is preferably added to the reaction system downstream from heat exchanger 10. Thus, the activator compound may be fed into the gas recycle system from dispenser 11 thru line 12.

Compounds of the structure $Zn(R_a)(R_b)$, wherein $R_a$ and $R_b$ are the same or different $C_1$ to $C_{14}$ aliphatic or aromatic hydrocarbon radicals, may be used in conjunction with hydrogen, with the catalysts of the present invention as molecular weight control or chain transfer agents, that is, to increase the melt index values of the copolymers that are produced. About 0 to 100, and preferably about 20 to 30 moles of the Zn compound (as Zn) would be used in the gas stream in the reactor per mol of titanium compound (as Ti) in the reactor. The zinc compound would be introduced into the reactor, preferably in the form of a dilute solution (2 to 30 weight percent) in a hydrocarbon solvent or absorbed on a solid diluent material, such as silica, in amounts of about 10 to 50 weight percent. These compositions tend to be pyrophoric. The zinc compound may be added alone, or with any additional portions of the activator compound that are to be added to the reactor from a feeder, not shown, which could be positioned adjacent to dispenser 11.

It is essential to operate the fluid bed reactor at a temperature below the sintering temperature of the polymer particles to insure that sintering will not occur. For the production of ethylene homopolymers and copolymers in the process of the present invention and operating temperature of about 30° to 115° C. is generally employed. Temperatures of about 75° to 95° C. are used to prepare products having a density of about 0.91 to 0.92, and temperatures of about 80° to 100° C. are used to prepare products having a density of about >0.92 to 0.94, and temperatures of about 90° to 115° C. are used to prepare products having a density of about >0.94 to 0.97.

The fluid bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

The partially activated composition is injected into the bed at a rate equal to its consumption at a point 13 which is above the distribution plate 8. Preferably, the catalyst is injected at a point in the bed where good mixing of polymer particles occurs. Injecting the catalyst at a point above the distribution plate is an important feature of this invention. Since the catalysts used in the practice of the invention are highly active, injection of the fully activated catalyst into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots". Injection of the catalyst into the reactor above the bed may result in excessive catalyst carryover into the recycle line where polymerization may begin and plugging of the line and heat exchanger may eventually occur.

A gas which is inert to the catalyst such as nitrogen or argon is used to carry the partially or completely reduced precursor composition, and any additional activator compound or non-gaseous chain transfer agent that is needed, into the bed.

The production rate of the bed is controlled by the rate of catalyst injection. The production rate may be increased by simply increasing the rate of catalyst injection and decreased by reducing the rate of catalyst injection.

Since any change in the rate of catalyst injection will change the rate of generation of the heat of reaction, the temperature of the recycle gas entering the reactor is adjusted upwards or downwards to accommodate the change in rate of the generation. This insures the maintenance of an essentially constant temperature in the bed. Complete instrumentation of both the fluidized bed and the recycle gas cooling system is, of course, necessary to detect any temperature change in the bed so as to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the rector (the difference between inlet gas temperature and exit gas temperature) is determinative of the rate of particulate polymer formation at a constant gas velocity.

The particulate polymer product is preferably continuously withdrawn at a point 14 at or close to the distribution plate 8 and in suspension with a portion of the gas stream which is vented as the particles settle to minimize further polymerization and sintering when the particles reach their ultimate collection zone. The suspending gas may also be used to drive the product of one reactor to another reactor.

The particulate polymer product is conveniently and preferably withdrawn through the sequential operation of a pair of timed valves 15 and 16 defining a segregation zone 17. While valve 16 is closed, valve 15 is opened to emit a plug of gas and product to the zone 17 between it and valve 15 which is then closed. Valve 16 is then opened to deliver the product to an external recovery zone. Valve 16 is then closed to await the next product recovery operation. The vented gas containing unreacted monomers may be recovered from zone 17 through line 18 and recompressed in compressor 19 and returned directly, or through a purifier 20, or line 21 to gas recycle line 6 at a point upstream of the recycle compressor 9.

Finally, the fluidized bed reactor is equipped with an adequate venting system to allow venting the bed during start up and shut down. The reactor does not require the use of stirring means and/or wall scraping means. The recycle gas line 6 and the elements therein (compressor 9, heat exchanger 10) should be smooth surfaced, and devoid of unnecessary obstructions so as not to impede the flow of recycle gas.

The highly active catalyst system of this invention appears to yield a fluid bed product having an average particle size between about 0.01 to about 0.12 inches, and preferably about 0.01 to about 0.06 inches.

The feed stream of gaseous monomer, with or without inert gaseous diluents, is fed into the reactor so as to achieve a space time yield of about 2 to 10 pounds/hour/cubic foot of bed volume.

The term virgin resin or polymer as used herein means polymer, in granular form, as it is recovered from the polymerization reactor.

The following Examples are designed to illustrate the process of the present invention and are not intended as a limitation upon the scope thereof.

The properties of the polymers produced in the Examples were determined by the following test methods:

Density: For materials having a density of <0.940, ASTM-1505 procedure is used and the plaque is conditioned for one hour at 100° C. to approach equilibrium crystallinity. For materials having a density of ≧0.940 a modified procedure is used wherein the test plaque is conditioned for one hour at 120° C. to approach equilibrium crystallinity and is then quickly cooled to room temperature. All density values are reported as kilograms/m$^3$. All density measurements are made in a density gradient column.

Melt Index (MI): ASTM D=1238—Condition E—Measured at 190° C.—reported as grams per 10 minutes.

Flow Rate (HLMI): ASTM D=1238—Condition F—Measured at 10 times the weight used in the melt index test above.

Melt Flow Ratio (MFR):=Flow Rate/Melt Index

Productivity: A sample of the resin product is ashed and the weight percent of ash is determined; since the ash is essentially composed of the catalyst, the productivity is thus the pounds of polymer produced per pound of total catalyst consumed. The amount of Ti in the ash is determined by elemental analysis. The values are reported in parts per million (ppm) of titanium metal.

Bulk density: The resin is poured via 1" diameter funnel into a 400 ml cylinder without shaking the cylinder, and weighed by difference. The values are reported in lbs/ft$^3$.

Average Particle size: Caluculated from sieve analysis data measured according to ASTM-D-1921 Method A using a 500 g sample. Calculations are based on weight fractions retained on the screens.

PREPARATION OF A PARTIALLY ACTIVATED PRECURSOR COMPOSITION IN TETRAHYDROFURAN (THF)

In a flask equipped with a mechanical stirrer, was placed an electron donor solvent, specifically tetrahydrofuran (THF), followed sequentially by the trialkylaluminum agent, anhydrous MgCl$_2$, and Davison grade 952 silica which had been dehydrated at 800° C. The solution was stirred for 15 minutes before adding TiCl$_4$ and optionally the remainder of the trialkylaluminum agent. The contents were then dried to a flowable powder under an N$_2$ purge at 60°±10° C. Higher residual THF in these dired partially activated precursor compositions tend to produce higher bulk density polymers.

The resulting composition of the instant invention is in the form of a partially activated precursor which is impregnated within the pores of the silica. The material is a free flowing particulate material having the size and shape of the silica. It is not pyrophoric unless the aluminum alkyl content exceeds a loading of 10 weight percent. It is stored under a dry inert gas such as nitrogen or argon for future use.

PARTIALLY ACTIVATED PRECURSORS

Using the partial activation procedure of the instant invention as detailed above, three partially activated precursor compositions were prepared. The components are listed in the order of the addition of the compounds to the mixing tank.

Precursor A
450 ml THF
Reducing Agent (1)
6.8 g MgCl$_2$
100 g silica
5.2 g TiCl$_4$
Reducing Agent (2)
Precursor B
450 ml THF
Reducing agent
6.8 g MgCl$_2$
100 g silica
5.2 g TiCl$_4$
Precursor C
450 ml THF
Reducing Agent (1)
6.8 g MgCl$_2$ 5.2 g TiCl$_4$
100 g silica
Reducing agent (2)
(1) Equivalent to 1.2% wt Al on the silica
(2) Remainder to give required total Al:Ti mol ratio (see Table I)

POLYMERIZATION

Additional activator compound is fed to the polymerization reactor for the purpose of completing the activation of a partially activated precursor composition It is fed into the reactor as a 5% solution in isopentane.

The activator compound is added to the polymerization reactor so as to maintain the Al/Ti mol ratio in the reactor at a level of about 30:1 to 60:1.

In the following examples, ethylene was copolymerized with butene-1.

Each of the polymerization reactions was continuously conducted for >1 hour after equilibrium was reached at a temperature of 85° C.; a pressure of 300 psia and a gas velocity of about 3 to 6 times $G_{mf}$ in a fluid bed reactor system at a space time yield of about 3 to 7 lbs/hr/ft$^3$ of bed space. The reactor system was as described in the drawing. It has a lower section 10 feet high and 13½ inches in (inner) diameter, and an upper section which was 16 feet high; and 23½ inches in (inner) diameter.

EXAMPLES 1–5

Table I below lists, with respect to Examples 1 to 5 the catalysts of the instant invention, i.e., the preparation sequence being detailed above—all of which were partially activated in the presence of excess electron donor.

In addition, Table I lists the total Al/Ti mol ratio; C$_4$/C$_2$ mol ratio; H$_2$/C$_2$ mol ratio in reactor; and the cocatalyst or activator compound used in the reactor to complete the activation of the partially activated precursor composition.

Table I also lists the catalyst productivity in terms of pounds of polymer produced/pound of titanium metal, reported in ppm of titanium metal; as well as the properties of the virgin polymer, i.e., density, melt index (MI), melt flow ratio (MFR), bulk density and average particle size.

TABLE I

FLUID BED POLYMERIZATION WITH CATALYSTS OF PRESENT INVENTION

| EXAMPLE | 1 | 2 | 3 | 4 | 5 |
|---|---|---|---|---|---|
| Catalyst Preparation | | | | | |
| Precursor | A | B | B | B | C |
| Activator Compound | TEAL | TEAL | TEAL | TNHAL | TEAL |
| Total Al/Ti Mol Ratio | 4 | 12 | 4 | 4 | 12 |
| Operating Conditions | | | | | |
| C$_4$/C$_2$ mol ratio | 0.45 | 0.46 | 0.48 | 0.44 | 0.42 |
| H$_2$/C$_2$ mol ratio | 0.16 | 0.21 | 0.16 | 0.17 | 0.23 |
| Cocatalyst | TIBA | TIBA | TIBA | TIBA | TIBA |
| Polymer Properties | | | | | |
| MI g/10 min. | 1.05 | 2.0 | 2.0 | 2.0 | 0.85 |
| MFR | 29 | 27 | 27 | 27 | 27 |
| Density, kg/m$^3$ | 919 | 920 | 920 | 920 | 921 |
| Ti, ppm | 1.0 | 1.4 | 1.0 | 1.0 | 2.5 |
| Granular Properties | | | | | |
| Bulk Density, lb/ft$^3$ | 16 | 22 | 14.5 | 14.5 | 18 |
| Average P.S., in. | 0.048 | 0.025 | 0.045 | 0.028 | 0.031 |

TIBA is triisobutylaluminum
TEAL is triethylaluminum
TNHAL is tri-n-hexylaluminum Examples 1 through 5 are illustrative of the high productivity catalysts that can be prepared via the single drying step method of the instant invention.

EXAMPLE 6–13

In a flask equipped with a mechanical stirrer, was placed 30 ml of an electron donor solvent, specifically tetrahydrofuran (THF), followed sequentially by triethylaluminum, a magnesium compound, optionally a halogen source and 5.0 grams of Davison grade 952 silica which had been dehydrated at 800° C. The Al:Mg:Ti mol ratio was 9:3:1. The solution was stirred for 15 minutes before adding 0.26 grams of TiCl$_4$. The contents were then dried to a flowable powder under N$_2$ purge at 60±10° C.

The resulting compositions are in the form of a partially activated precursor which is impregnated within the pores of the silica. The material is a free flowing particulate material having the size and shape of the silica. They are not pyrophoric unless the aluminum alkyl content exceeds a loading of 10 weight percent. It is stored under a dry inert gas such as nitrogen or argon for future use.

Additional activator compound (co-catalyst) is fed to a polymerization reactor as a 20% solution in hexane to complete the activation of the partially activated precursor composition.

Polymerizations were carried out in a one (1) liter gas phase stirred reactor at a temperature of 85° C. for one hour at 130 psi C$_2$H$_4$; 20 psi H$_2$; 20 ml hexene-1; and an Al/Ti mol ratio of approximately 40:1.

The polymerization reaction was carried out in the presence of about 135 grams of a granular polyethylene of known properties.

Table II lists, with respect to Examples 6–13, catalysts prepared as above-described, all of which were partially activated in THF for purposes of comparison. Also listed is the activator compound (co-catalyst), the productivity (activity) of the catalyst and the M.I., M.F.R. and bulk density of the polymers producted by these catalysts.

Where the additional halogen source present, i.e., Examples 6–11, the halogen source was stoichiometrically in excess, that is, more than two halide ions were present per magnesium ion.

Examples 12 and 13 are indicative of the low productivity realized with catalysts prepared in the absence of a halogen source other than the titanium compound.

TABLE II
LABORATORY GAS PHASE POLYMERIZATION USING ALTERNATE MAGNESIUM SOURCES

| Magnesium Compound | Halogen Source | Activator Compound (Cocatalyst) | Productivity (g PE/mmole Ti/hr/100 psi $C_2H_4$) | MI | MFR | BD lbs/ft$^3$ |
| --- | --- | --- | --- | --- | --- | --- |
| (6) Mg(OEt)$_2$ | ZnCl$_2$ | TEAL/EDAC | 2323 | 2.1 | 25 | 26 |
| (7) Mg(OEt)$_2$ | ZnCl$_2$ | TEAL | 2050 | 2.8 | 30 | 26 |
| (8) Mg(OEt)$_2$ | EADC | TEAL | 1617 | 1.7 | 26 | 28 |
| (9) (MgBu)$_2$AlEt$_3$ | ZnCl$_2$ | TIBA | 2102 | 1.9 | 29 | 26 |
| (10) BuMgBr | DEAC | TIBA | 1250 | 3.1 | 28 | 28 |
| (11) BuMgBr | ZnCl$_2$ | TIBA | 974 | 3.1 | 27 | 27 |
| (12) Mg(OEt)$_2$ | — | TEAL | 140 | — | — | — |
| (13) MgO | — | TEAL | 29 | — | — | — |

EADC is ethylaluminum dichloride
DEAC is diethylaluminum chloride
Et is ethyl group;
Bu is butyl group These examples are illustrative of the versatility of the instant invention in that although some halogen must be present in addition to that supplied by the titanium compound for an effective catalyst, it can be introduced from sources other than the magnesium compound and thus the scope of useful magnesium compounds is greatly increased.

EXAMPLES 14–18

In Examples 14–18, partially activated precursor compositions were prepared using the order of addition in Examples 2 through 4 and the stoichiometry of Examples 6–13, with a variety of ethers as the electron donor solvent.

Table III lists the ether solvents, their boiling points and the activity of the resultant catalysts. Polymerizations were carried out in a one (1) liter gas phase stirred reactor under conditions described in Examples 6–13.

TABLE III
EFFECT OF BOILING POINT OF ELECTRON DONOR ON CATALYST ACTIVITY

| Electron Donor Solvent | Boiling Point, °C. | Activity of Catalyst (g PE/mmole Ti/hr/100 psi $C_2H_4$) |
| --- | --- | --- |
| (14) Tetrahydrofuran | 67 | 2398 |
| (15) Tetrahydropyran | 88 | 1493 |
| (16) Dipropyl ether | 91 | 1200 |
| (17) DiButyl ether | 142 | 187 |
| (18) Diphenyl ether | 259 | 0 |
| (19) Ethyl acetate | 77 | 975 |

The activity of these catalysts illustrate the advantages of using electron donor solvents with boiling points below about 120° C.

What is claimed is:

1. A process for preparing a partially activated precursor composition, in the presence of an insoluble porous support, which comprises
   dissolving in an electron donor solvent
   at least one titanium compound; at least one magnesium compound; and at least one activator compound;
   said titanium compound having the structure Ti(OR)$_a$X$_b$
   wherein R is a $C_1$ to $C_{14}$ aliphatic or aromatic hydrocarbon radical, or COR$^I$ wherein R$^I$ is a $C_1$ to $C_{14}$ aliphatic or aromatic hydrocarbon radical,
   X is selected from the group consisting of Cl, Br, I or mixtures thereof
   a is 0 to 4 inclusive; b is 0 to 4 inclusive and a+b=3 or 4;
   said magnesium compound having the structure MgX$_2^I$, wherein X$^I$ is selected from the group consisting of Cl, Br, I or mixtures thereof;
   said electron donor solvent being a liquid organic compound in which said magnesium compound and said titanium compound are soluble and which is selected from the group consisting of alkyl esters of aliphatic carboxylic acids, aliphatic ethers, and cyclic ethers,
   said activator compound having the formula Al(R$^{IV}$)$_c$X$_d^{II}$H$_e$ wherein X$^{II}$ is Cl or OR$^V$, R$^{IV}$ and R$^V$ are the same or different $C_1$ to $C_{14}$ saturated hydrocarbon radicals, d is 0 to 1.5, e is 1 or 0 and c+d+e=3, and
   impregnating said partially activated precursor composition into said support by drying,
   said magnesium compound being present from about 0.5 to 56 mols per mol of titanium compound,
   said activator compound being present in excess of one mol per mol of titanium and
   said porous support being present from about 50 to about 95 weight percent based on the total weight of the solid composition.

2. A process as in claim 1 wherein said partially activated precursor composition is completely activated in a polymerization reactor with 10 to 400 mols of an activator compound per mol of titanium compound in said composition.

3. A process as in claim 1 wherein said magnesium compound comprises MgCl$_2$.

4. A process as in claim 1 wherein said electron donor solvent comprises at least one ether.

5. A process as in claim 4 wherein said ether comprises tetrahydrofuran.

6. A process as in claim 1 wherein said titanium compound comprises TiCl$_4$.

7. A process as in claim 2 wherein
   said activator compound for said partially activated precursor composition is triethylaluminum; and
   said activator compound for completely activating said partially activated precursor composition is triisobutylaluminum.

8. A process for preparing a partially activated precursor composition, in the presence of a porous support, which comprises
   dissolving in an electron donor solvent
   at least one titanium compound; at least one magnesium compound; at least one activator compound; and at least one halogen containing compound, said titanium compound having the structure $$Ti(OR)_a X_b$$

wherein R is a $C_1$ to $C_{14}$ aliphatic or aromatic hydrocarbon radical, or $COR^I$ wherein $R^I$ is a to $C_1$ $C_{14}$ aliphatic or aromatic hydrocarbon radical, X is selected from the group consisting of Cl, Br, I or mixtures thereof, a is 0 to 4 inclusive, b is 0 to 4 inclusive, and $a+b=3$ or 4;

said magnesium compound having the structure $$R^{II} Mg X^I_{2-n}$$

wherein $X^I$ is selected from the group consisting of Cl, Br, I and mixtures thereof, n is 1 or 2

$R^{II}$ is selected from the group consisting of $R^{III}$, $OR^{III}$ and $OCOR^{III}$ where $R^{III}$ is the same or different $C_1$ to $C_{14}$ aliphatic or aromatic hydrocarbon radical, said electron donor solvent being a liquid organic compound in which said magnesium compound and said titanium compound are soluble and which is selected from the group consisting of alkyl esters of aliphatic and aromatic carboxylic acids, aliphatic ethers, and cyclic ethers, said activator compound having the formula $$Al(R^{IV})_c X_d^{II} H_e$$

wherein $X^{II}$ is Cl or $OR^V$; $R^{IV}$ and $R^V$ are the same or different $C_1$ to $C_{14}$ saturated hydrocarbon radicals, d is 0 to 1.5, e is 1 or 0 and $c+d+e=3$, said halogen containing compound being one which upon reaction with the magnesium compound forms a magnesium halide having the structure $$MgX_2^I$$

and impregnating said partially activated precursor composition into said support by drying, said magnesium compound being present from about 0.5 to 56 mols per mol of titanium compound, said activator compound being present in excess of one mol per mol of titanium and said porous support being present from about 50 to about 95 weight percent based on the total weight of the solid composition.

9. A process as in claim 8 in which said halogen containing compound is $ZnCl_2$.

10. A process as in claim 8 in which said halogen containing compound is $Et_a AlCl_b$ where $a+b=3$ and $b>0$.

* * * * *

UNITED STATES PATENT AND TRADEMARK OFFICE
CERTIFICATE OF CORRECTION

PATENT NO. : 4,427,573

DATED : January 24, 1984

INVENTOR(S) : David Lucas Miles et al.

It is certified that error appears in the above—identified patent and that said Letters Patent is hereby corrected as shown below:

Column 1, line 58, "provides" should read -- provide --.

Column 2, line 57, insert a comma (,) after "4,293,673".

Column 4, line 11, "< 0" should read -- > 0 --.

Column 4, line 12, ">10:1" should read -- <10:1 --.

Column 5, line 20, "14,215" should read -- $\underline{14}$, 215 --.

Column 7, line 15, "usual" should read -- useful --.

Column 7, line 41, "$R_n^{II} MgX_2^{I-n}$" should read -- $R_n^{II} MgX_{2-n}^{I}$ --.

Column 8, line 15, the period (.) should be a comma (,).

Column 8, line 39, "$A\ell\frac{1}{b}(R^{IV})_c X_d^{II} H_e \, ps$" should read -- $Al(R^{IV})_c X_d^{II} H_e$ --.

Column 11, line 29, "Diffusion" should read -- Diffusing --.

Column 12, line 10, "and" should read -- an --.

Column 13, line 66, "D=1238" should read -- D-1238 --.

Column 14, line 1, "D=1238" should read -- D-1238 --.

Column 14, line 17, "Caluculated" should read -- Calculated --.

Column 14, line 34, "dired" should read -- dried --.

Column 15, line 11, "composition It" should read -- composition. It --.

UNITED STATES PATENT AND TRADEMARK OFFICE
CERTIFICATE OF CORRECTION

PATENT NO. : 4,427,573        Page 2 of 2

DATED : January 24, 1984

INVENTOR(S) : David Lucas Miles et al.

It is certified that error appears in the above—identified patent and that said Letters Patent is hereby corrected as shown below:

Column 16, line 61, after "source" insert -- was --.

Column 17, Table II, column 3, "TEAL/EDAC" should read -- TEAL/EADC --.

Column 17, Table III, column 1, "DiButyl" should read -- Dibutyl --.

Column 19, line 6, "to" should be deleted.

Column 19, line 15, "$R^{II}MgX^{I}_{2-n}$" should read -- $R^{II}_{n}MgX^{I}_{2-n}$ --.

Signed and Sealed this

Thirtieth Day of October 1984

[SEAL]

Attest:

GERALD J. MOSSINGHOFF

Attesting Officer    Commissioner of Patents and Trademarks